United States Patent
Creta et al.

(10) Patent No.: US 6,216,247 B1
(45) Date of Patent: Apr. 10, 2001

(54) 32-BIT MODE FOR A 64-BIT ECC CAPABLE MEMORY SUBSYSTEM

(75) Inventors: Kenneth C. Creta, Fountain Hills; Elliot Garbus, Scottsdale, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/087,390

(22) Filed: May 29, 1998

(51) Int. Cl.[7] .................................................. G11C 29/00
(52) U.S. Cl. ............................ 714/763; 714/42; 714/768
(58) Field of Search ............................. 714/42, 763, 764, 714/766, 768, 773, 785

(56) References Cited

U.S. PATENT DOCUMENTS

| | | | |
|---|---|---|---|
| 4,201,337 | * 5/1980 | Lewis et al. ........................ | 714/785 |
| 5,481,552 | * 1/1996 | Aldereguia et al. ................ | 714/773 |
| 5,555,250 | * 9/1996 | Walker et al. ....................... | 714/763 |
| 5,835,704 | * 10/1998 | Li et al. ............................... | 714/42 |

* cited by examiner

Primary Examiner—Emmanuel L. Moise
(74) Attorney, Agent, or Firm—Blakely, Sokoloff, Taylor & Zafman LLP

(57) ABSTRACT

A 32-bit mode operation for a typical 64-bit ECC memory subsystem. In 32-bit mode, each data block will have an 8-bit ECC value, which is consistent with ECC values generated for 64-bit data. This is achieved by prefixing the data with 32 zeroes. When reading out data, memory faults can be corrected and detected using ECC techniques on a zero prefixed data block that is read out of the memory. This allows a memory subsystem to be optimized for bandwidth and latency depending upon this application.

18 Claims, 6 Drawing Sheets

32-BIT MODE FOR A 64-BIT ECC CAPABLE MEMORY SUBSYSTEM

BACKGROUND OF THE INVENTION

1. Field of the Invention

The invention relates generally to computer systems design and development. More specifically, the invention relates to the design of memories and memory subsystems for use in computer systems.

2. Description of the Related Art

In servers and systems that are not by nature servers, but operate in a server capacity, reliability has often been the controlling issue. Now, with increased load by more complex applications and more numerous client base, performance has also become an issue. To solve the performance problem in servers, separate intelligent I/O (Input/Output) systems have been developed which specifically address certain specific performance and reliability issues with regard to various server functions. Intelligent I/O includes the use of an I/O processor (IOP) separate from the host processor which performs many of the I/O functions of the computer system so that the host processor is freed from the incessant slowdown due I/O interrupts and other mechanisms which burden applications running on the host processor.

Two I/O functions that may be offloaded to the IOP include the RAID (Redundant Array of Inexpensive Disks) algorithm and networking packet assembly and disassembly. To handle these and other functions, the IOP is always accompanied by a local memory. For instance, such a local memory could act as the disk cache upon which the parity image for the RAID algorithm is stored and updated. The I/O subsystem's local memory must be designed such that it minimizes latency and can handle the throughput required for various applications. Further, the memory configuration is best if utilizing standard readily available memory components so that the cost is not increased by the need to introduce special size/configuration memory components into the system.

Due to the differences in what is required from the local I/O memory, however, it is often impossible to choose a configuration of memory that will be optimal for all potential I/O functions. Specifically in this regard, the use of memories equipped with Error Correction Code (ECC) mechanisms demands certain specific design constraints. ECC-capable memory is utilized since it allows for the detecting of double bit errors (two bits are incorrect within a transfer block) and for correcting a single bit error, and thus provides improved reliability over parity memory (which has the capability of detecting but not correcting single bit errors and no capability with regard to double bit errors). ECC however is currently implemented for systems that have 64-bit wide data busses. Sixty-four-bit ECC uses operations such as hashing to generate an 8-bit value which may help detect an error for the 64 bits in each data block. Thus, the entire memory bus would have a bandwidth of 72 bits, which, being a multiple of 4, may be readily assembled since memory modules are currently manufactured as in widths of 4, 8, 16 and 32 bits.

However, having a 64-bit architecture may impose a burden upon I/O functions that prefer a lower cost over performance. To have the reliability advantage of ECC and the optimization of 32-bit architectures useful for certain I/O functions, it would be desirable to generate the hamming code for 32-bit data. By definition, a hamming code generated for 32 bits of data is less than 6 bits wide. Thus, a total memory width of N bits, where N is not a multiple of 8 or 4 would be needed. This is inconvenient to assemble since N is not a multiple of 4 or 8. In certain I/O processors that desire a 32-bit implementation as well as a hamming code, it would be advantageous to still generate an 8-bit hamming code so that both 64 bit and 32 bit data busses can be supported by the memory architecture. The 40 bits resultant from 32-bit data and an 8-bit Hamming code would allow for convenient assemblage since 40-bit memory modules are industry standards. Further, in intelligent I/O systems where both a 32-bit mode and 64-bit mode are available (so that design is more flexible based on the I/O function), it would be desirable to have ECC reliability without increasing the complexity of the addressing implicit in each mode.

SUMMARY OF THE INVENTION

What is disclosed is a method that includes placing a memory subsystem into a first mode, the memory subsystem operating previously in a second mode, the first mode indicative of a first data block transfer size, the second mode indicative of a second data block transfer size, the second size larger than the first size, and transacting a data block with the memory subsystem in the first mode, the transacting performed with error correction code capability in either of the modes.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
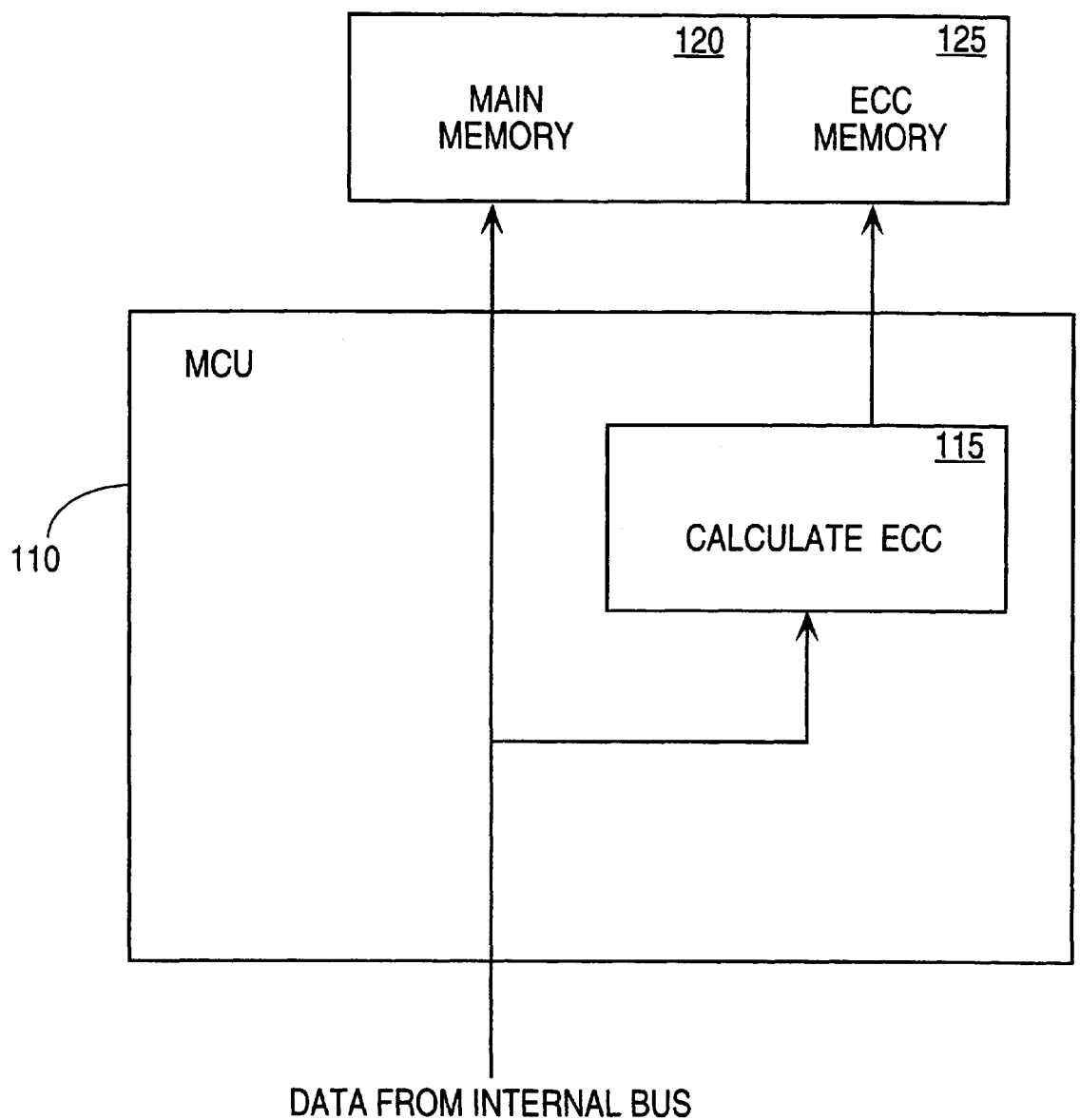
FIG. 1 illustrates a data flow for conventional ECC write-to-memory (WTM) transaction.

FIG. 1 illustrates a data flow for conventional ECC write-to-memory (WTM) transaction.

FIG. 1 shows a Memory Controller Unit (MCU) 110 which controls the read-from-memory (REM) and write-to-memory (WTM) data transactions that occur with and internal data bus (not pictured). MCU 110 is coupled to a Main Memory (MM) 120 and an ECC memory 125. When a WTM transaction is occurring, no error checking and correction would be required since the data written to main memory would be deemed already valid. However, since what is written may eventually be read, the ECC value should be determined prior to or contemporaneous with the actual write into MM 120. The purpose of ECC is to detect errors in the storage of data into the MM 120 (i.e., memory faults). Thus, MCU 110 has a module or circuitry 115 which computes the ECC value using well-known operations such as Hamming Codes. The computation of an ECC value for a given block of data is well-known in the art of memory sub-systems and will not be discussed so as not to obscure the invention. The ECC value thus computed is then stored into ECC memory 125 along the address line(s) corresponding to the data from which the ECC value is generated is to be written.

As mentioned earlier, the ECC value is 8 bits for a data size of 64-bits and thus, ECC-capable memory has been standardized as having a multiple of 8 bits data width (72). By contrast, if the data size were 32 bits, the generated ECC value for each 32-bit data block would be less than 8 bits. The ECC value is used, as shown and described in FIG. 2, to detect and correct any errors due to the faultiness of the MM 120. MCU 110 will thus need to both write the ECC value into the ECC memory 125 and write the data block corresponding to that ECC value into MM 120. While error correction or detection is not needed in the WTM transaction of FIG. 1, it is needed in the RFM transaction shown in FIG. 2.

Figure 2:
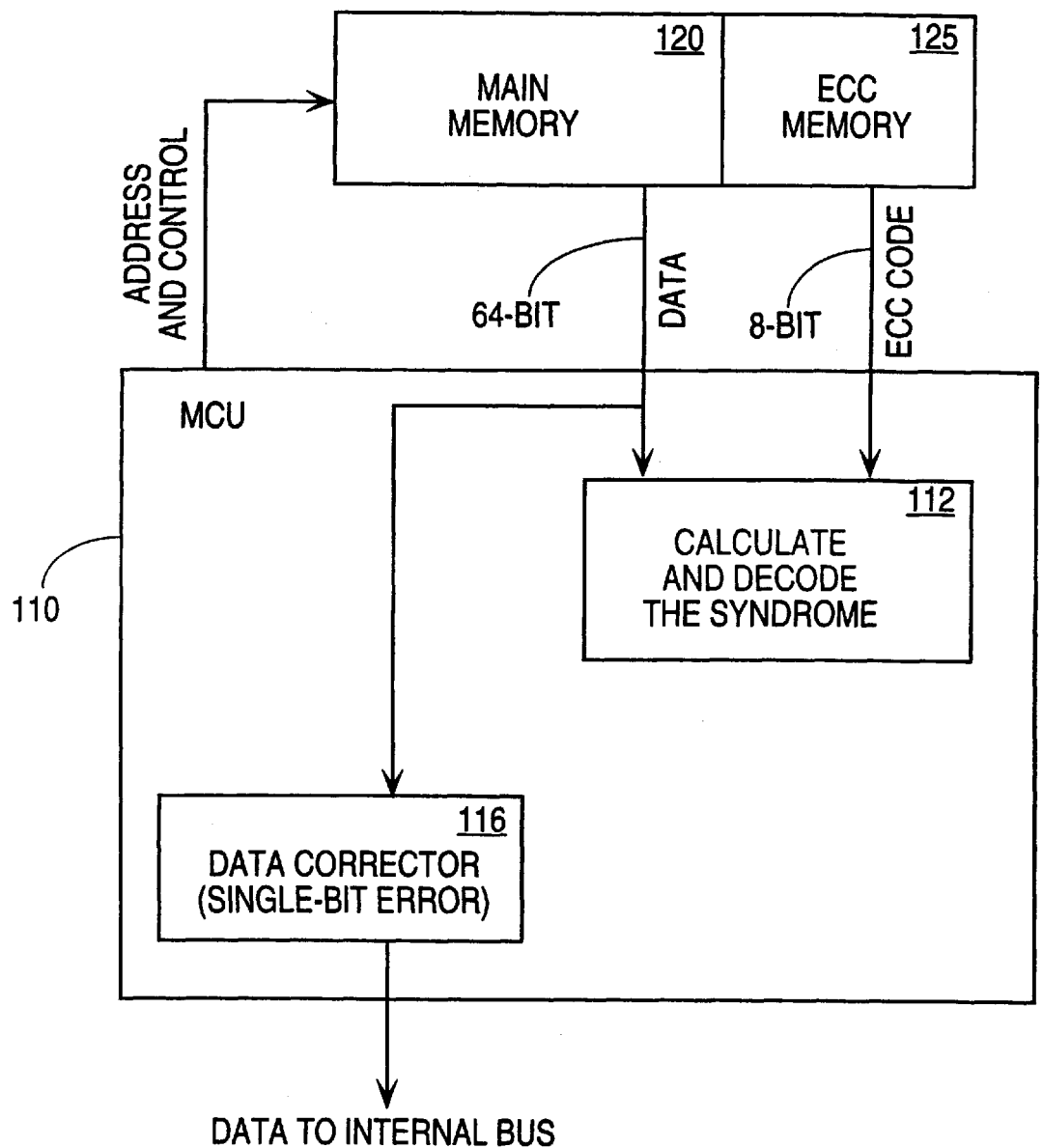
FIG. 2 illustrates data flow for conventional ECC read-from-memory (RFM) transaction.

FIG. 2 illustrates data flow for conventional ECC read-from-memory (RFM) transaction.

The elements of FIG. 2 with the same reference numbers as that shown in FIG. 1 are identical with the following distinctions in operation. The MCU 110 functions differently during a RFM transaction. Several steps are required to complete a RFM transaction. First, MM 120 is accessed to cause a read from MM 120 and ECC memory 125 to attain both the data and corresponding ECC value stored during the RFM phase for that data. The data and its corresponding ECC value are next passed to a module/circuitry 112 that calculates a "syndrome", which is well-known in the art, based upon the data and the ECC value. The syndrome indicates if there is an error and whether or not it can be corrected. A syndrome value of "0" indicates that there is no error in the data. A syndrome with an odd number of "1"s indicates that a single bit error has occurred and also, indicates which bit of the 64 to correct. If the syndrome contains an even number of zeroes, there is a double bit or more error which can be detected but cannot be corrected. A data correction circuitry/module 116 either passes the data from MM 120 through to the internal bus, or upon receiving an appropriate syndrome indication, corrects the bit in error. In case of detected double error, the MCU 110 generates a warning to the operating system, BIOS, and/or applications that a double bit memory error has occurred. The currently running process, thread, application or entire system can then be reset if so desired. The data correction circuitry/module 116 can be implemented by multiplexing two bit masks—the first a string of zeroes the width of the data bus and the second a string which has all zeroes except for a "1" in the bit location determined to be in error. If there is a correctable error, then the second string may be selected and XORed with the data string which would yield a corrected data string, the data string being corrected to the state prior to its original write into MM 120. In the case of no error, the string of all zeroes would be selected to be XORed with the data string so that the data string passes to the internal bus unaltered.

The above description of FIGS. 1 and 2 describes a conventional single-moded 64-bit ECC-capable memory subsystem. The conventional memory subsystem is not well-equipped to handle a 32-bit data block and generate an ECC value that can be written to the ECC memory since a 32-bit data block's ECC value would be of an odd size less than 8 bits, which is not readily available. Thus, the invention seeks to equip a memory subsystem with the capability of ECC for 32-bit data as well as for 64-bit data. This allows the memory subsystem to behave on its data path as transacting either 32-bit or 64-bit. Depending on the mode, the MCU 120 will carry out slightly differing procedures for RFM and WTM from those described in FIGS. 1 and 2.

Figure 3:
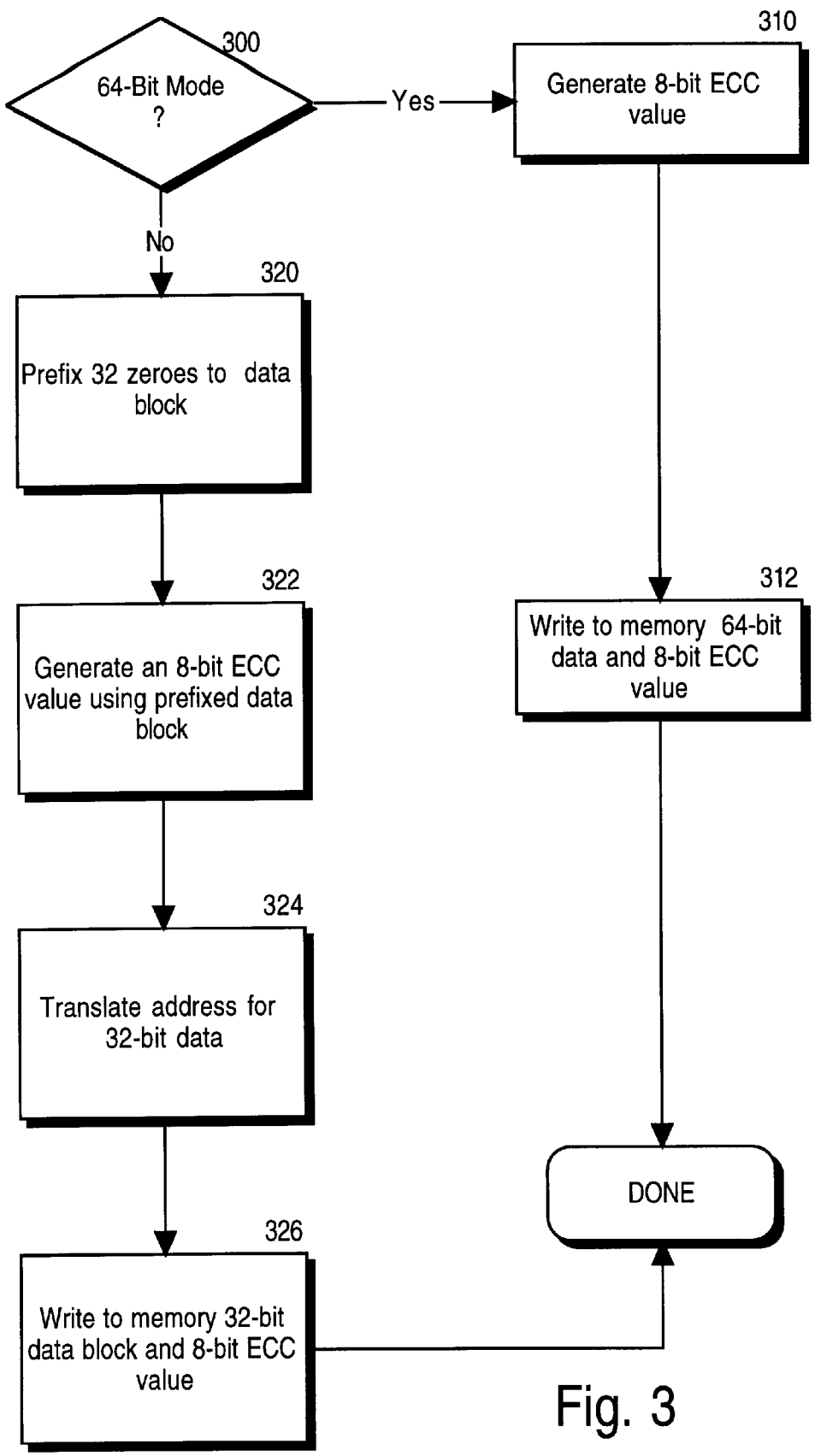
FIG. 3 is a flow diagram of a WTM transaction according to one embodiment of the invention.

FIG. 3 is a flow diagram of a WTM transaction according to one embodiment of the invention.

With a dual-moded WTM (Write-To-Memory) capability, a 32-bit mode may be implemented along with the conventional 64-bit data transfer mode. A plurality of other modes may also be implemented by utilizing the principles discussed herein. A mode signal or selector will indicate whether the memory subsystem is in 32-bit mode or 64-bit mode. If the system is in 64-bit mode (checked at step 300), then ordinary 64-bit ECC WTM operations take place. In this case, according to step 310, the 8-bit ECC value is generated for the 64-bit data block. Then, both the 64-bit data block and the 8-bit ECC are written to memory (step 312).

If the system is not in 64-bit mode (checked at step 300), then according to one embodiment of the invention, the memory subsystem must be in a 32-bit data transfer mode. In this case, the first step is to prefix 32 zeroes to the beginning of the 32-bit data block that is sought to be written, thereby creating a virtual 64-bit block (step 320). In alternate embodiment, any 32-bit constant may be prefixed, given that the same constant is utilized in both WTM and RFM. With a virtual 64-bit data block thus generated, the next step is to generate an 8-bit ECC value for that virtual 64-bit zero prefixed data block (step 322). The next step is to translate the address of the data block from an address that is generated by the host system for 64-bit data to an address consistent with 32-bit data to be written to the memory (step 324). Once the address is translated, then the 32-bit data block is written to memory along with the 8-bit ECC (step 326). The address translation may be performed concurrently with the prefix step or subsequently to its time.

Figure 4:
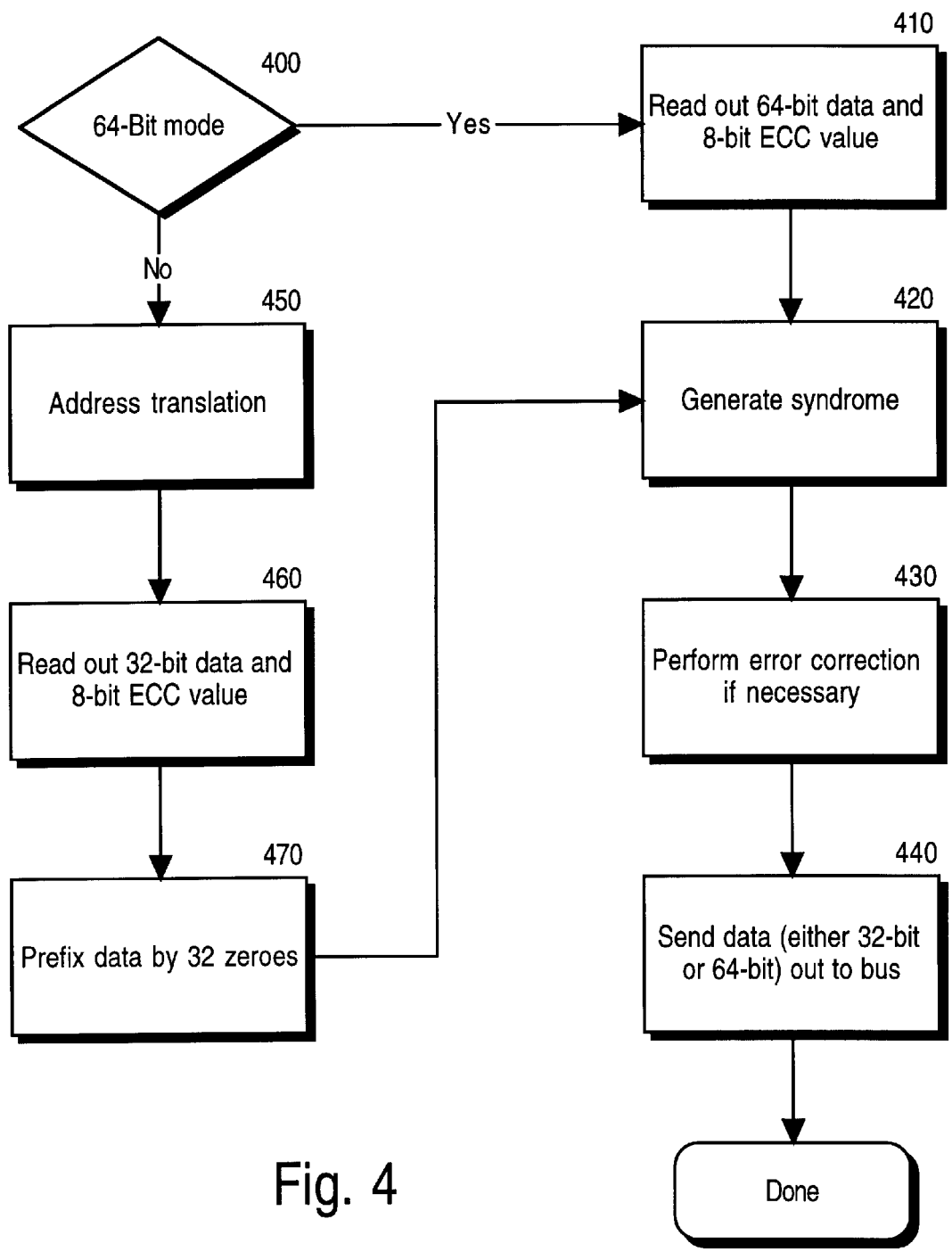
FIG. 4 is a flow diagram of a RFM transaction according to one embodiment of the invention.

FIG. 4 is a flow diagram of a RFM transaction according to one embodiment of the invention.

With a dual-moded read from memory (RFM) capability according to one embodiment of the invention, a 32-bit mode may be implemented along with the conventional 64-bit ECC data transfer mode. A plurality of other modes may also be implemented, if so desired, based on the principles discussed herein. A mode signal or selector will indicate whether the system is in 32-bit mode or 64-bit mode. If the system is in 64-bit mode (checked at step 300), then ordinary ECC RFM operation will be undertaken. In this case, according to step 410, a 64-bit data block and its corresponding 8-bit ECC value are read out of memory into the memory controller or similar mechanism. Once the data and corresponding ECC value are read, a syndrome is generated (step 420). The syndrome is an indicator of whether or not an error exists in the data and if the error is a correctable one. The generation of a syndrome for a given data block and its corresponding ECC value is well-known in the art and will not be further described. If error correction is necessary, it is performed on the data block (step 430). The data is then sent out to the processor or bus (step 440).

If the system is not in 64-bit mode, then according to one embodiment of the invention, the system must be in 32-bit mode. In 32-bit mode, one step is to perform address translation (step 450). The address for 64-bit data generated by the system must be translated into an address for 32-bit data since the memory subsystem is physically 32-bits wide and will be addressed from the processor (or host system). Once the address is translated, a 32-bit data block and an 8-bit ECC value corresponding to it is read out (step 460). The 32-bit data block is prefixed by 32 zeroes (step 470). Again, according to an alternate embodiment, any 32-bit constant may be used as prefix so long as the same constant is utilized for both RFM and WTM transactions. This creates a virtual 64-bit data block from which the 8-bit ECC value may be used to generate a syndrome (step 420). The steps of error correction and the sending out of data (steps 430 and 440) are repeated for the 32-bit data as well by utilizing the virtual 64-bit data block to correct any errors in the 32-bit original data portion.

Figure 5:
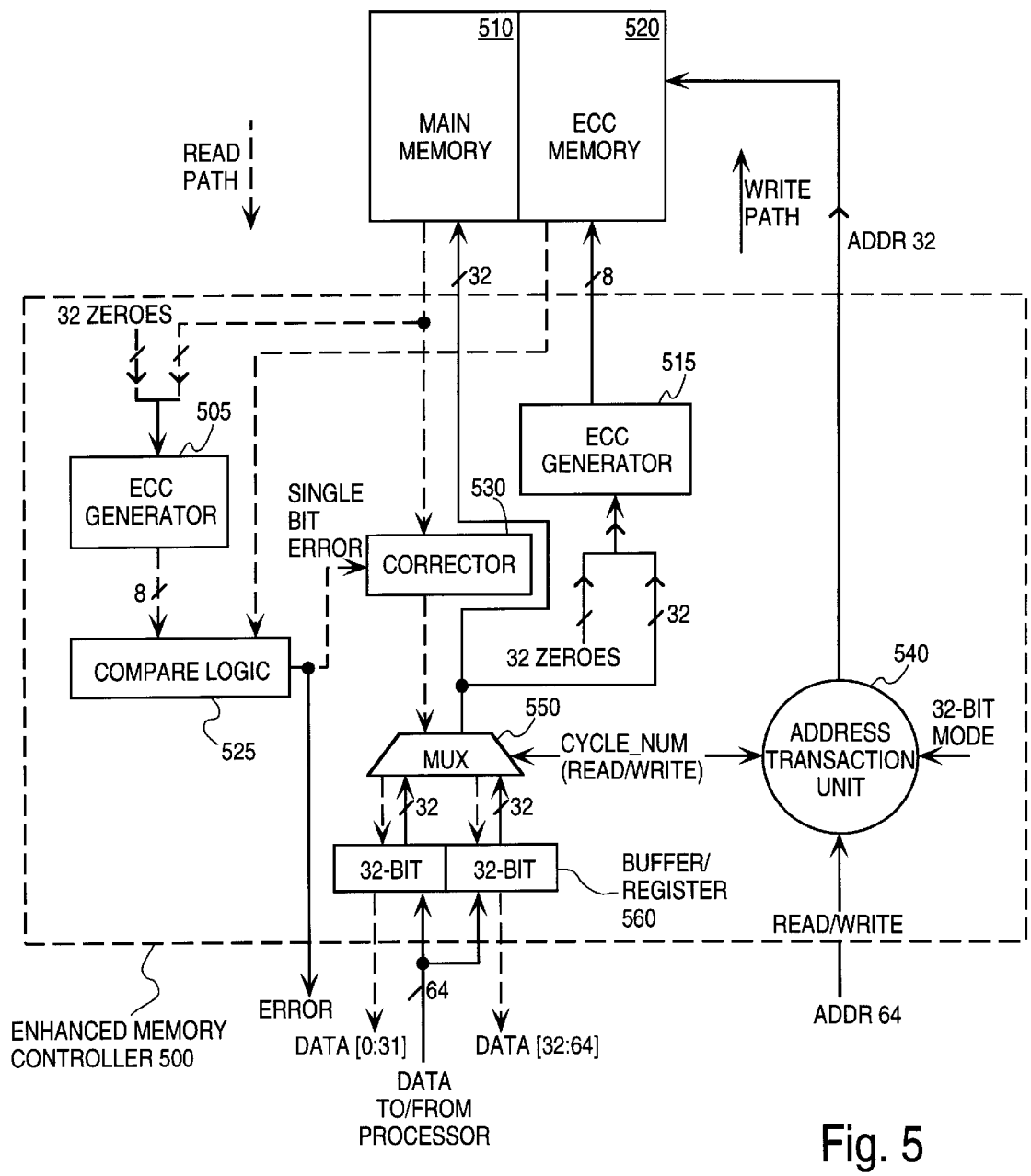
FIG. 5 is a diagram illustrating circuitry for the 32-bit mode for ECC memory according to one embodiment of the invention.

FIG. 5 is a diagram illustrating circuitry for the 32-bit mode for ECC memory according to one embodiment of the invention.

FIG. 5 shows a main memory 510 and an ECC memory 520 which is coupled to an enhanced memory controller 500. The enhanced memory controller 500 sends and receives 64-bit data to/from a processor or system, according to one embodiment of the invention. Memories 510 and 520 are addressed or indexed so that each main memory data block that is pointed to by an address will also concurrently point to the ECC value corresponding to that main memory data block stored in ECC memory 520. The diagram of FIG. 5 shows a read path, denoted by dashed lines, for reading data out to the processor (or system) from main memory 510 and a write path, denoted by solid lines, for writing data to main memory 510 from the processor (or system). The shown data paths correspond to the 32-bit mode reading and writing of main memory 510 in 32-bit mode. By tilizing more complex control signals and switches than those shown, the 32-bit ECC mode can be integrated with typical 64-bit ECC operation without extra apparatus.

In 32-bit mode, the processor will still provide data to and receive data from the memory controller 50 in 64-bit blocks as it would when the memory subsystem is in typical 64-bit mode. In 32-bit mode, a buffer/register 560 is divided into two 32-bit segments. A 64-bit data block is transacted from/to the processor, according to one embodiment of the invention in two 32-bit consecutive blocks. The CYCLE_NUM signal will regulate a multiplexer (MUX) 550 which selects between either the first 32-bit segment of buffer/register 560 or the second 32-bit segment of buffer/register 560. CYCLE_NUM is also utilized to regulate an address translation unit 540 which translates an address for 64-bit data (ADDR 64) into an address for 32-bit data (ADDR 32). Depending on whether the first or second segment is being written, the ATU 540 will translate the 64-bit address in a slightly different manner. This address translation will be apparent to one of ordinary skill in the art of designing memory and addressing units.

In a write-to-memory (WTM) transaction, the appropriate 32-bit segment of buffer/register 560 will be selected by MUX 550 onto main memory 510. Since a data block for a write is assumed to be correct from the standpoint of memory storage faults, no correction is necessary during the write once in the memory subsystem. Simultaneous with the write of 32-bit data, an ECC value, according to one embodiment of the invention, is also generated. In order to utilize widely available memory modules and to simplify operation in maintaining a dual-moded capable memory, an 8-bit ECC value must be generated. In order to generate an 8-bit ECC value, 32 zeroes are prefixed to 32-bit data block in order to create a virtual 64-bit data block. An ECC generator 515 will, like other conventional ECC generating apparatus, generate an 8-bit ECC value from the virtual zero prefixed 64-bit data block. This 8-bit ECC value is written to ECC memory 520. In this manner, each 32-bit data block written to main memory 510 will have a corresponding 8-bit ECC value, for a total of 40 bits per write transaction.

In a read-from-memory (REM) transaction, the architecture of FIG. 5 operates as follows. In an RFM, a 32-bit data block is read out of a main memory 510 and its corresponding 8-bit ECC value is read out of ECC memory 520. 32 zeroes are prefixed to the 32-bit data block. This virtual zero-prefixed 64-bit data block will be identical to the 64-bit data block created when the data was written to main memory 510 if the 32-bit data being read out contains no errors. To detect the presence of error, a second ECC generator 505 is coupled to the main memory 510 and receives the virtual 64-bit zero-prefixed data block and generates therefrom an 8-bit ECC value. A compare logic 525 coupled to ECC generator 505 compares this generated ECC value from ECC generator 505 with the ECC value being read out from ECC memory 520. Under current ECC technology, if a single-bit error is detected (i.e., the compare logic 525 shows that the generated and read-out ECC values are different that the difference relates to a 1-bit error in the data block), then corrector 530 receives a signal causing it to correct the appropriate bit in error. The read out 32-bit data is also sent to corrector 530 while being sent to ECC generator 505. The data block will reside in corrector 530 until a signal is received from compare logic 525 indicating an error or no error. At that point, corrector 530 will either send the 32-bit data block to MUX 550 without correction or correct the block first before sending it to MUX 550. The MUX 550 will receive the 32-bit data block and based on the signal CYCLE_NUM, will place it in either one of the 32-bit segments of register/buffer 560. When 64 bits of data are ready to read out of buffer/register 560, they are sent out to the system or processor. If there is a detected memory error, the signal from compare logic 525 will also be sent to flag the processor and system that a memory error has occurred and may even indicate an uncorrectable data error. This allows the user/software/operating system or BIOS to take whatever measures is deemed appropriate with regard to the memory fault such as a resetting of the system. Compare logic 525 differs from an ordinary comparator in that it can be configured to indicate what kind of error (single-bit or otherwise) is present according to the techniques of ECC technology. This may include compare logic 525 generating a syndrome which is well-known in the art of ECC. As with the WTM transaction, address translation unit 540 will translate the address for 64-bit read (ADDR 64) into an address for a 32-bit data read. Further, a "32-bit mode" signal or indicator can be utilized to indicate whether the subsystem should be in 32-bit mode or 64-bit mode. The typical 64-bit ECC operation can be maintained by utilizing this mode signal to switch or control components such as ATU 540, MUX 550 and the zero prefixing which is un-needed in 64-bit mode. In 64-bit mode, enhanced memory controller 500 will operate similar to the memory controller units discussed in FIGS. 1 and 2.

Figure 6:
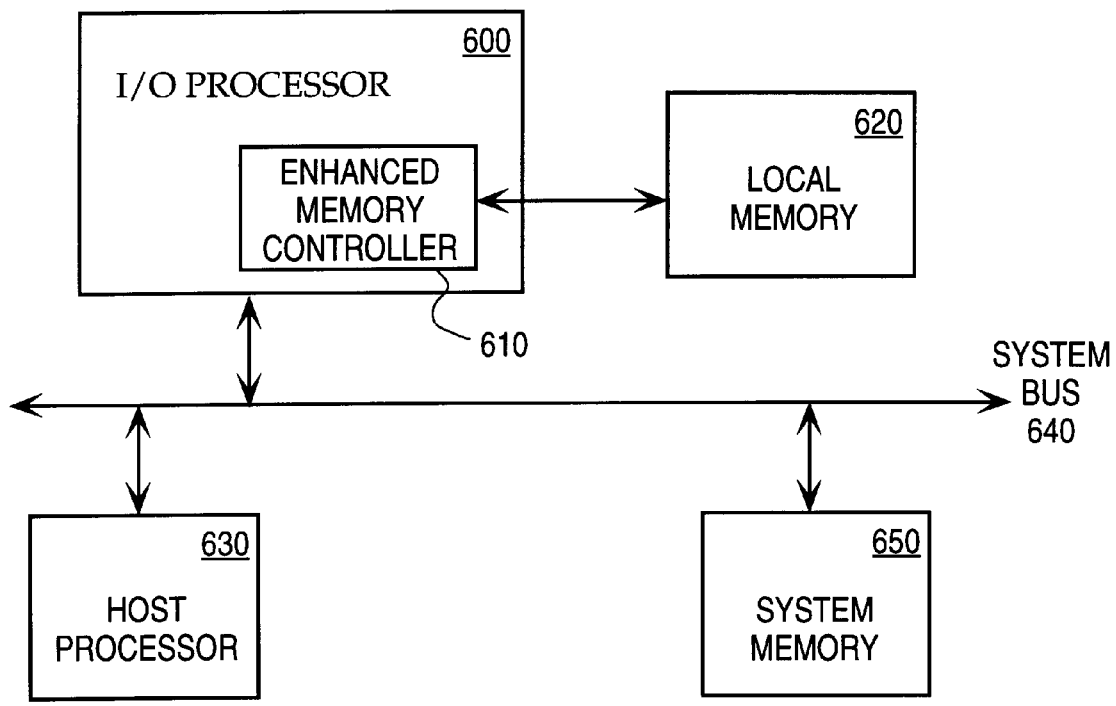
FIG. 6 is a block diagram of one embodiment of the invention.

FIG. 6 is a block diagram of one embodiment of the invention.

FIG. 6 shows an exemplary system in which a dual-moded capable memory may be utilized. The system of FIG. 6 has two separate processors, a host processor 630 and an I/O processor 600 which are connected over a system 640. Other busses, bridges and intermediate interconnect devices that may be implemented have been omitted so as not to obscure the invention.

I/O processor 600 has an enhanced memory controller 610 which regulates and interfaces with a local memory 620. According to one embodiment of the invention, the host processor 630 may be transacting with other devices, memories and system 640 in 64-bit data blocks. Enhanced memory controller 610 allows I/O processor 600 to transact with local memory 620 in either 32-bit mode or 64-bit mode. Enhanced memory controller 610 may have an architecture similar to that of enhanced memory controller 500 in FIG. 5 which allows for a 32-bit mode by segmenting 64-bit data blocks in half and utilizing the zero append to calculate 8-bit ECC values. Local memory 620 contains both the ECC memory and "main memory" (data memory) referred to in FIG. 5. The host processor 630 and I/O processor 600 transact 64-bit data blocks, but the I/O processor is capable of either a 64-bit or a 32-bit operation. Advantageously, the change of memory mode from 64-bit to 32-bit or vice-versa may be indicated or signaled by host processor 630 issuing a command to do so. In an application such as network data transfer, communications software executed by the host processor may desire the I/O processor 600 behave on 32-bit mode rather than 64-bit mode to improve granularity. The processor/application may be able to determine, based on the performance or function of the I/O processor, which mode is most optimal. For instance, in a RAID (Redundant Array of Inexpensive Disks) application, bandwidth may be more vital, since the stored data is of a larger size than networking application. In such an instance, 64-bit mode may be desired over 32-bit mode. If I/O processor 600 were to integrate the handling of different I/O functions such as storage and networking, it is advantageous to have dual-moded memory subsystem that can be application optimized for performance. The I/O processor is moded in memory, but a system memory 650 and host processor 630 maintain a single mode capability.

Figure 7:
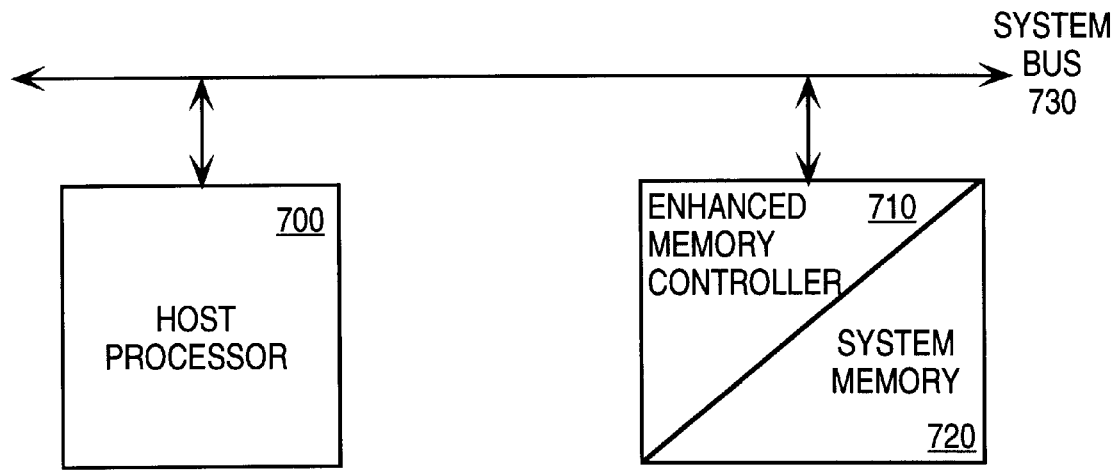
FIG. 7 is a system diagram of one embodiment of the invention.

FIG. 7 is a system diagram of one embodiment of the invention.

In FIG. 7, a processor 700 and enhanced memory 710 are coupled to a bus 730. A memory 720 is coupled to enhanced memory controller 710 through which data contained in memory 720 is accessed. Memory 720 and enhanced memory controller 710 are similar in composition to memory controller 600 and local memory 620 with the following exceptions. In this embodiment, the processor 700 is the main system processor or CPU and interacts directly with enhanced memory controller 710. The processor 700 can issue a command/signal to place, according to one embodiment of the invention, a 64-bit system into 32-bit mode. The bus 730 can thus either operate to transfer 32-bit data blocks in that mode on 64-bit data blocks in another mode. This differs from the embodiment of FIG. 6 where the host system (processor and system memory 720) itself is capable of a memory mode change. In this embodiment, a BIOS or other software may allow a user to choose between 32-bit or 64-bit modes.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:

placing a memory subsystem into a first mode, said memory subsystem operating previously in a second mode, said first mode indicative of a first data block transfer size, said second mode indicative of a second data block transfer size, said second size larger than said first size; and transacting a data block with said memory subsystem in said first mode, said transacting performed with error correction code capability in either of said modes.

2. A method according to claim 1 wherein transacting a write in said first mode to said memory subsystem comprises:

prefixing a constant to said data block being written creating a virtual data block of the second size; and writing said data block and an ECC value generated from said virtual data block to said memory subsystem.

3. A method according to claim 2 wherein writing comprises:

generating an ECC value by using said virtual data block, said ECC value consistent in size with ECC values generated for data of said second size; and translating an address consistent with data of said second size into an address consistent with data of said first size.

4. A method according to claim 2 wherein said constant is a string of zeroes.

5. A method according to claim 1 wherein transacting a read in said first mode from said memory subsystem comprises:

reading said data block and a corresponding ECC value for said data block from said memory subsystem.

6. A method according to claim 5 wherein reading comprises:

translating an address consistent with data of said second size to an address consistent with data of said first size; and detecting the presence of error in said data block being read.

7. A method according to claim 6 wherein detecting comprises:

prefixing said data block by a constant to form a virtual data block of said second size;

generating a syndrome from said virtual data block, said syndrome indicating whether an error exists in said virtual data block and whether said error is correctable; and if an error is correctable, fixing said error prior to sending said data block from said memory subsystem.

8. A method according to claim 7 wherein said constant is a string of zeroes.

9. An apparatus for transacting data with a processor comprising:

an enhanced memory controller configured to send and receive data to said processor;

a first memory coupled to said controller, said first memory configured to store data received from said enhanced memory controller; and a second memory coupled to said controller, said second memory configured to store ECC values corresponding to said data stored in said first memory, said enhanced memory controller configured to transact data to and from first memory in one of a first size or second size and to send and receive data outside said apparatus in said second size, said second size larger than said first size, said enhanced memory controller configured to perform error correction code data verification.

10. An apparatus according to claim 9 wherein said enhanced memory controller comprises:

a register being of said second size, said register divided into segments of said first size;

a multiplexer coupled to said register, said multiplexer selecting the data from one of said segments; and an ECC correction and generation circuitry coupled to said multiplexer, configured to generate an ECC value for said selected data during a write transaction and configured to detect and correct an error prior to said selected data being read from said enhanced memory controller during a read transaction.

11. An apparatus according to claim 10 wherein said ECC generation and correction circuitry comprises:

a data corrector coupled between said first memory and said multiplexer, said corrector correcting an error in data being read during a read transaction, and configured to pass through without correction of data to said first memory during a write transaction; and a compare logic coupled to said data corrector, said compare logic configured to detect the existence and type of error in data being read during a read transaction, said compare logic configured to signal a correctable error condition to said data corrector.

12. An apparatus according to claim 9 wherein said processor transacts data only in said second size, said enhanced memory controller when transacting data with the first memory in said first size transacts data with the processor when said second size is reached.

13. An apparatus according to claim 11 wherein said ECC generation and error correction circuitry further comprises:

a first ECC generator coupled between said multiplexer and said second memory and configured to receive during a write transaction a virtual data block composed of said data segment from said multiplexer prefixed by a constant sufficient to cause said virtual data block to be of said second size, said first ECC generator configured to generate and send an ECC value for said virtual data block to said second memory.

14. An apparatus according to claim 11 wherein said ECC circuitry further comprises:

a second ECC generator coupled between said compare logic and said first memory and configured to receive during a read transaction a virtual data block composed out data being read out of said first memory prefixed by a constant such that said virtual data block is of the second size, said second ECC generator generating an ECC value from said virtual data block and configured to send said generated ECC value to said compare logic.

15. An apparatus according to claim 14 wherein said compare logic is configured to read out from said second memory an ECC value for the data being read during the read transaction and compare said read out ECC value with said generated ECC value, said comparison indicating the existence of and type of any error in said data being read.

16. An apparatus according to claim 15 wherein any indication of error is sent to said processor.

17. An apparatus according to claim 11 wherein said ECC circuitry further comprises:

an address translation unit coupled to said first and second memory, said address translation unit configured to access locations in said first and second memories by translating an address for data of the second size into an address for data of the first size, said address translation unit operable during both read and write transactions.

18. A system comprising:

a processor transacting data in a first size;

an enhanced memory controller coupled to said processor through a bus;

a first memory coupled to said enhanced memory controller, said first memory configured to store data in either one of said first size or in a second size, the first size being larger than the second size; and a second memory coupled to said enhanced memory controller, said second memory configured to store an ECC value for data stored in said first memory consistent with data of the first size, whether said data stored in said first memory is of said first size or said second size, the data capable of being subject to ECC verification.

* * * * *

UNITED STATES PATENT AND TRADEMARK OFFICE
CERTIFICATE OF CORRECTION

PATENT NO. : 6,216,247 B1
DATED : April 10, 2001
INVENTOR(S) : Creta et al.

It is certified that error appears in the above-identified patent and that said Letters Patent is hereby corrected as shown below:

Column 2,
Line 66, delete "(REM)" and insert -- (RFM) --.

Column 3,
Line 56, delete "applications" and insert -- application[s] --.

Column 6,
Line 16, delete "(REM)" and insert -- (RFM) --.

Signed and Sealed this

Seventh Day of May, 2002

Attest:

JAMES E. ROGAN
*Attesting Officer*

*Director of the United States Patent and Trademark Office*